W. HEYN.
Auger.
No. 215,744. Patented May 27, 1879.
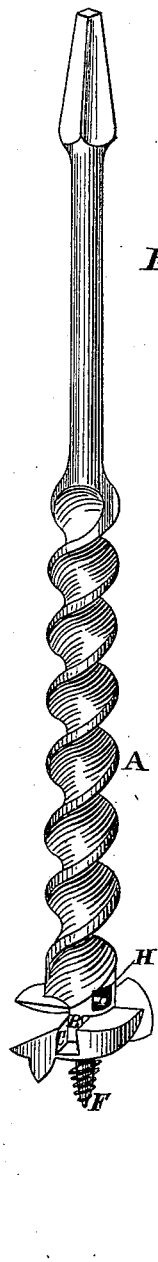
Fig. 1.
Fig. 3.
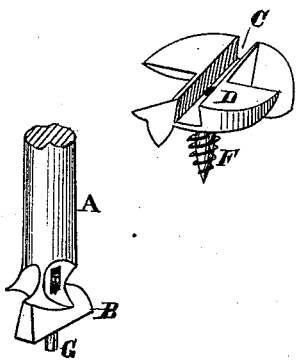
Fig. 2.
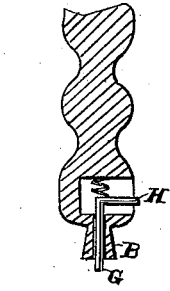
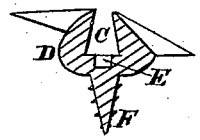
Witnesses
Geo. H. Strong
Frank A. Brooks
Inventor
William Heyn
By Dewey & Co.

UNITED STATES PATENT OFFICE.

WILLIAM HEYN, OF SAN FRANCISCO, CALIFORNIA.

IMPROVEMENT IN AUGERS.

Specification forming part of Letters Patent No. 215,744, dated May 27, 1879; application filed October 28, 1878.

*To all whom it may concern:*

Be it known that I, WILLIAM HEYN, of the city and county of San Francisco, and State of California, have invented an Improvement in Boring-Implements; and I do hereby declare the following to be a full, clear, and exact description thereof, reference being had to the accompanying drawings.

My invention relates to certain improvements in implements for boring; and it consists in a novel construction of a circular cutter, the lower or boring end of which is in shape and form like that of the usual double-twisted augers, having a dovetailed or other suitably-formed slot, locking or centering device across its diameter, and also two grooves running at right angles from the above-mentioned slot toward a gimlet-pointed screw in the lower or boring end, through which the shavings are being discharged toward the operator while boring.

In combination with this I employ either a plain and smooth or a partly-twisted stem or shank having a beveled or other suitably-formed projection or locking device, which fits those of the circular cutter in such a manner as to unite the two principal and vital parts into one solid whole, thus forming a veritable borer.

In order to fasten all cutters which may be employed with the same stem or shank centrally onto the said stem or shank, I have made use of a centrally-operating locking and centering pin, placed in the lower end of the shank.

To more fully explain my invention, reference is made to the accompanying drawings, in which—

Figure 1 is a view of the shank and cutter-head as employed in the present case. Fig. 2 is a separate view of the cutter-head as employed in the present case. Fig. 3 is a view of the shank and locking device as now employed.

A is the stem or shank of an auger or boring-bit. Across the center of the lower end of this stem is a transverse projection, B, in the form of a dovetail, which is intended to fit into a corresponding slot, C, in the back of the cutter-head D. This slot is made transversely across the diameter of the cutter-head, and may be in section, of a dovetail form, as shown, or it may be of any suitable shape to receive and hold the projection B, which slides into it.

The cutter-head or bit is made in the form usual to the cutting end of augers or bits, but is only made of sufficient length to allow the transverse slot C to be made of a depth to receive and steady the projection B upon the shank.

In order to secure the cutter to the shank so that any sized cutter which may be used shall be exactly centered, a hole, E, is made in the bottom of the slot C, just in line with the center-point F. A hole is also drilled into the end of the shank A midway between the ends of the transverse projection B, and a pin, G, is fitted into this hole, having a spring behind it, which causes it to be forced into the hole E when in line with it.

A thumb-piece or point, H, projects from the pin G, through a slot in the side of the shank, so that by pressing against it the pin G can be withdrawn from the hole E, so as to have the cutter-head free to be removed.

It will thus be seen that a great many different sizes of cutter-heads may be employed with the same stem or shank, and that also the same cutter-head which performed the duties of an ordinary brace-bit may be put onto a longer stem, and thus transformed into a car-bit, millwright-auger, or other similar cutting-tool, and that, furthermore, it will only be necessary to put the different sizes of cutters into a small box or case, with several sizes and shapes of stems, thus providing a full set of bits or augers, as are usually employed by carpenters, millwrights, &c., which will occupy but very little space.

Having thus described my invention, what I claim as new, and desire to secure by Letters Patent, is—

The shank A, provided with the dovetail B, in combination with the centering and fastening pin G, provided with a spring, and the cutter-head D, all constructed and operated as shown.

In witness whereof I have hereunto set my hand.

WM. HEYN.

Witnesses:
 J. H. TINGMON,
 OSCAR A. TOLLE.